US011038921B1

(12) United States Patent
Adams et al.

(10) Patent No.: US 11,038,921 B1
(45) Date of Patent: *Jun. 15, 2021

(54) DETECTING MALICIOUS ACTORS

(71) Applicant: Rapid7, Inc., Boston, MA (US)

(72) Inventors: Samuel Adams, Andover, MA (US); Nicholas Davis, Boston, MA (US); Andrew Keely, Wakefield, MA (US); Jeffrey D. Myers, Somerville, MA (US); Colin O'Brien, San Francisco, CA (US)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,511

(22) Filed: Apr. 21, 2020

Related U.S. Application Data

(63) Continuation of application No. 16/113,408, filed on Aug. 27, 2018, now Pat. No. 10,666,681.

(60) Provisional application No. 62/612,546, filed on Dec. 31, 2017.

(51) Int. Cl.
*H04L 29/06* (2006.01)

(52) U.S. Cl.
CPC .................. *H04L 63/1491* (2013.01)

(58) Field of Classification Search
CPC ............ H04L 63/1491; H04L 63/1466; H04L 63/1425; G06F 21/552
See application file for complete search history.

(56) References Cited

U.S. PATENT DOCUMENTS

| | | | |
|---|---|---|---|
| 6,826,697 B1 * | 11/2004 | Moran | G06F 21/55 709/223 |
| 9,282,115 B1 * | 3/2016 | Kaushik | H04L 63/1408 |
| 9,756,063 B1 | 9/2017 | Chung | |
| 10,291,637 B1 * | 5/2019 | Bardenstein | H04L 63/1408 |
| 10,447,733 B2 * | 10/2019 | DiValentin | H04L 63/1416 |
| 10,484,419 B1 | 11/2019 | Davis | |
| 10,547,638 B1 | 1/2020 | Li | |
| 2010/0313266 A1 | 12/2010 | Feng | |
| 2013/0333038 A1 * | 12/2013 | Chien | G06F 21/645 726/23 |
| 2014/0016560 A1 * | 1/2014 | Hunkeler | H04L 41/12 370/328 |
| 2016/0359872 A1 * | 12/2016 | Yadav | H04L 43/0894 |
| 2017/0041332 A1 * | 2/2017 | Mahjoub | H04L 43/0876 |
| 2017/0061396 A1 * | 3/2017 | Melika | G06Q 20/384 |
| 2017/0132408 A1 | 5/2017 | Kim | |
| 2017/0169241 A1 | 6/2017 | Unagami | |
| 2017/0180378 A1 | 6/2017 | Tyler | |
| 2017/0180421 A1 * | 6/2017 | Shieh | H04L 63/10 |
| 2017/0244672 A1 * | 8/2017 | Shulman | H04L 12/4633 |
| 2017/0244749 A1 * | 8/2017 | Shulman | H04L 63/1425 |
| 2017/0318053 A1 | 11/2017 | Singh | |
| 2017/0331789 A1 | 11/2017 | Kumar | |

(Continued)

*Primary Examiner* — Joseph P Hirl
*Assistant Examiner* — Stephen T Gundry
(74) *Attorney, Agent, or Firm* — Ashwin Anand

(57) ABSTRACT

Methods and systems for detecting a malicious actor on a network. In some embodiments the system may gather data regarding one or more authentic hostnames on a network, and generate a pseudo hostname based on the gathered data. The system may then issue a network discovery request for the pseudo hostname. Based on a response to the network discovery request, the system may execute one or more remedial actions.

20 Claims, 3 Drawing Sheets

(56) References Cited

U.S. PATENT DOCUMENTS

| | | | |
|---|---|---|---|
| 2017/0331856 A1* | 11/2017 | Vissamsetty | H04L 63/1491 |
| 2017/0346853 A1* | 11/2017 | Wyatt | H04L 9/3265 |
| 2018/0048658 A1 | 2/2018 | Hittel | |
| 2018/0048665 A1 | 2/2018 | Shulman | |
| 2018/0097840 A1* | 4/2018 | Murthy | H04L 63/02 |
| 2018/0145993 A1 | 5/2018 | Akiyama | |
| 2018/0332064 A1* | 11/2018 | Harris | G06F 15/16 |
| 2019/0052650 A1* | 2/2019 | Hu | G06F 21/552 |
| 2019/0132358 A1* | 5/2019 | DiValentin | H04L 63/20 |
| 2019/0190950 A1* | 6/2019 | Senecal | H04L 63/166 |
| 2019/0205530 A1* | 7/2019 | Brown | G06F 21/552 |
| 2019/0207969 A1* | 7/2019 | Brown | G06F 21/552 |
| 2020/0036683 A9* | 1/2020 | Shulman | H04L 63/0245 |

* cited by examiner

DETECTING MALICIOUS ACTORS

CROSS-REFERENCE TO RELATED APPLICATIONS

The present application claims the benefit of and priority to U.S. utility patent application Ser. No. 16/113,408, filed on Aug. 27, 2018, and issued as U.S. Pat. No. 10,666,681, on May 26, 2020, which claims the benefit of and priority to U.S. provisional application No. 62/612,546, filed on Dec. 31, 2017, the entire disclosures of which are hereby incorporated by reference as if set forth in their entirety herein.

TECHNICAL FIELD

Embodiments described herein generally relate to systems and methods for network security and, more particularly but not exclusively, to systems and methods for detecting malicious actors on a network.

BACKGROUND

Due to its prevalence in today's society and popularity for connecting financial resources and data sources, the internet and connected networks have become a hub for criminal activity. Malicious actors on these networks commonly attempt to mimic a trusted source to entice unsuspecting users to share confidential or otherwise sensitive information such as credentials. Once these malicious actors have gained access to these credentials or other sensitive information, they may cause further damage on a network, steal information, escalate their privileges, or perform other types of malicious acts.

A need exists, therefore, for methods and systems for detecting malicious actors on these networks.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for detecting a malicious actor on a network. The method includes receiving data regarding at least one authentic hostname on the network; generating a pseudo hostname based on the data regarding the at least one authentic hostname; issuing a network discovery request for the pseudo hostname; receiving a response to the network discovery request; and executing at least one remedial action based on the received response.

In some embodiments, the data regarding the at least one authentic hostname on the network includes network traffic involving at least one legitimate system on the network.

In some embodiments, the method further includes detecting at least one pattern associated with the at least one authentic hostname on the network. In some embodiments, generating the pseudo hostname includes generating the pseudo hostname in accord with the at least one detected pattern. In some embodiments, the detected pattern includes at least one of a Unicode character, a word, an alphanumeric token, and an alphanumeric sequence.

In some embodiments, generating the pseudo hostname includes generating the pseudo hostname based on the at least one authentic hostname.

In some embodiments, generating the pseudo hostname includes executing a distance measuring algorithm on the pseudo hostname with respect to the at least one authentic hostname on the network to ensure the generated pseudo hostname is within a predetermined distance from the at least one authentic hostname.

In some embodiments, the network discovery request is selected from the group consisting of a NetBIOS request, an ARP discovery request, a DNS discovery request, a DHCP discovery request, a Bonjour discovery request, and a UPnP discovery request.

In some embodiments, generating the pseudo hostname includes receiving at least one authentic hostname and mutating at least one portion of the at least one authentic hostname.

In some embodiments, the generated pseudo hostname is based on a template.

According to another aspect, embodiments relate to a system for detecting a malicious actor on a network. The system includes an interface for receiving data regarding at least one authentic hostname on the network; a memory; and a processor executing instructions stored on the memory to generate a pseudo hostname based on the data regarding the at least one authentic hostname, issue a network discovery request for the pseudo hostname, receive a response to the network discovery request, and execute at least one remedial action based on the received response.

In some embodiments, the data regarding the at least one authentic hostname on the network includes network traffic involving at least one legitimate system on the network.

In some embodiments, the processor is further configured to detect at least one pattern associated with the at least one authentic hostname on the network. In some embodiments, the processor generates the pseudo hostname in accord with the at least one detected pattern. In some embodiments, the detected pattern includes at least one of a Unicode character, a word, an alphanumeric token, and an alphanumeric sequence.

In some embodiments, the pseudo hostname is generated based on the at least one authentic hostname.

In some embodiments, the processor generates the pseudo hostname by executing a distance measuring algorithm on the pseudo hostname with respect to the at least one authentic hostname to ensure the generated pseudo hostname is within a predetermined distance from the at least one authentic hostname.

In some embodiments, the network discovery request is selected from the group consisting of a NetBIOS request, an ARP discovery request, a DNS discovery request, a DHCP discovery request, a Bonjour discovery request, and a UPnP discovery request.

In some embodiments, the processor is configured to generate the pseudo hostname by receiving at least one authentic hostname and mutating at least one portion of the at least one authentic hostname.

In some embodiments, the generated pseudo hostname is based on a template.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
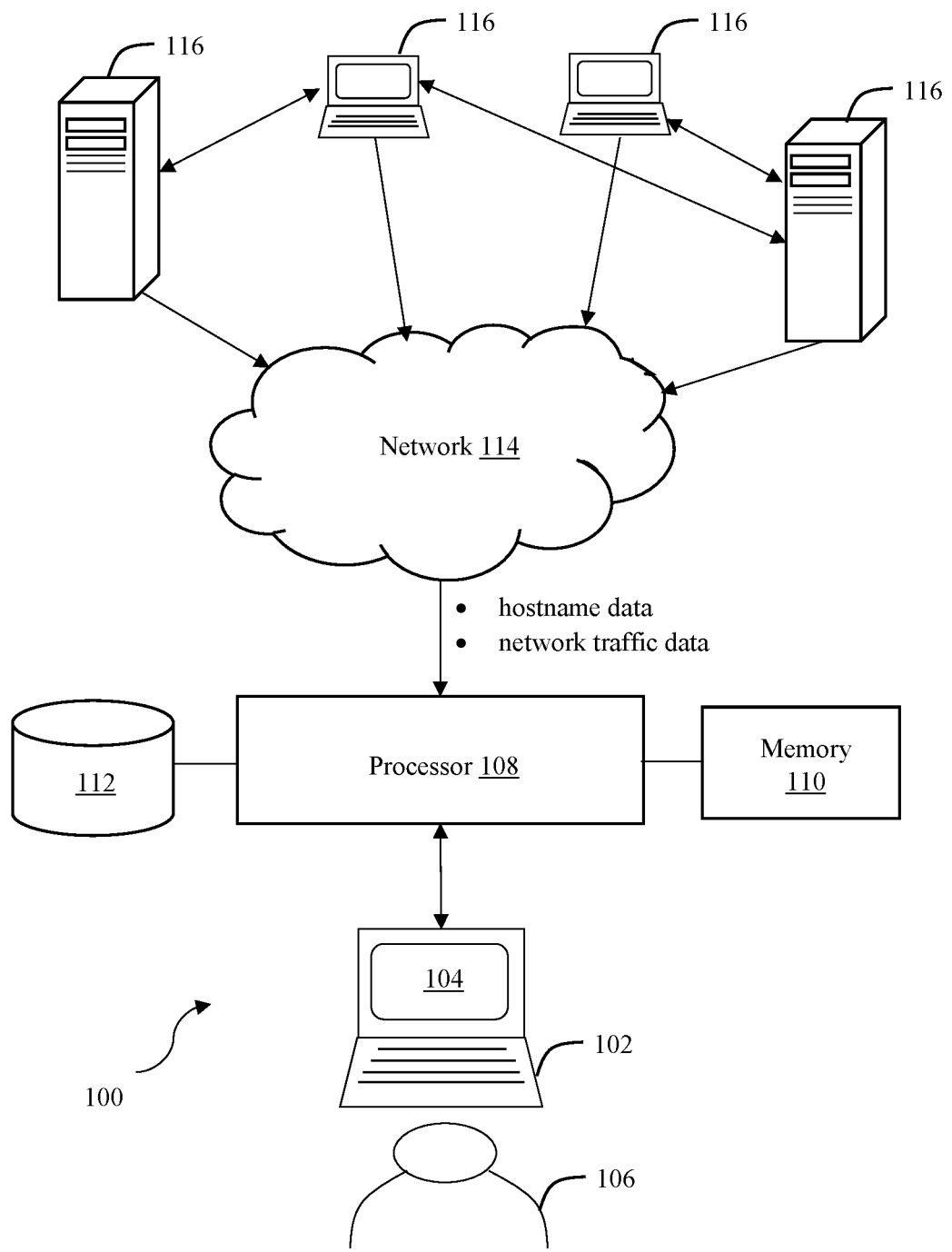
FIG. 1 illustrates a system for detecting a malicious actor on a network in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Malicious actors commonly monitor traffic on a network. Often times this traffic includes discovery requests in which a user or device asks systems on the network where it can find a specific device or system.

Malicious actors therefore listen to these requests and impersonate other devices or systems, claiming they are the sought-after device or system. An unsuspecting user may then share sensitive information with the malicious actor, thinking the malicious actor is the sought-after system or device.

Therefore, in order to secure a network against these types of attacks or deceitful acts, it is necessary to detect when a malicious actor is attempting to impersonate a device or service. Unsuspecting users will then be less likely to share sensitive information if these malicious actors are identified and unable to impersonate a device or service.

Existing techniques for identifying these malicious actors may involve generating random hostnames and sending out discovery requests for the generated random hostnames, hoping that an attacker will attempt to impersonate a device with a made up hostname, thereby making their presence known. However, a careful malicious actor will see these generated random hostnames and be able to identify them as irrelevant or even as a trap. For example, the below list shows exemplary network activity (with IP addresses obfuscated) that may be presented to a malicious actor monitoring a network.

Request by *.*.*.* for 1EE1A60F05DB63E8CBAF92
Request by *.*.*.* for JSMITH
Request by *.*.*.* for WORKGROUP
Request by *.*.*.* for PRINTER2-3
Request by *.*.*.* for PROJECTDEV
Request by *.*.*.* for D708A6CFD1381DEFD0D3
Request by *.*.*.* for GRP1-WIN-1234
Request by *.*.*.* for GRP2-WIN-2345
Request by *.*.*.* for GRP2-LNX-3456
Request by *.*.*.* for BFFE32AD092402BDC17
Request by *.*.*.* for GRP3WIN4567
Request by *.*.*.* for DDFA6596B20D22B513A55

It is clear from this data which hostnames are synthetic and which are authentic. Some hostnames appear as random while others follow some type of pattern or are in some type of format. The malicious actor may therefore focus on systems of interest with hostnames that convey meaning or are otherwise appear to be relevant/not a trap.

The malicious actor may then respond to one of the requests for an authentic hostname, claiming to be the sought-after host, system, device, etc. Unsuspecting users making the requests may then share sensitive information (e.g., credentials, bank account information, etc.) with the malicious actor. Once in possession of this sensitive information, the malicious actor may steal information, cause fraudulent financial transactions, or cause further damage to a network.

To detect these types of malicious actors, the systems and methods described herein may generate pseudo hostnames and then issue network discovery requests for the generated pseudo hostnames. As these pseudo hostnames do not exist (i.e., there are no actual devices/systems with the generated pseudo hostname), any response from a user or device claiming to be associated with the generated pseudo hostname is indicative of a malicious actor.

To overcome the shortcomings of existing techniques discussed above, the systems and methods described herein may generate pseudo hostnames that will interest a malicious actor. For example, the systems and methods described herein may generate pseudo hostnames that appear similar to known, authentic hostnames on the network. Accordingly, a malicious actor may be more inclined to respond to a network discovery request for the generated pseudo hostname, thereby exposing themselves.

FIG. 1 illustrates a system 100 for detecting a malicious actor on a network in accordance with one embodiment. The system 100 may include a user device 102 executing a user interface 104 that is accessible by a user 106 (e.g., network security personnel), and a processor 108 executing instructions stored on a memory 110.

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to a user 106.

The user interface 104 may enable a user 106 such as a network administrator or security personnel to input operational parameters and view data regarding the generated pseudo hostnames, responses to network discovery requests, data regarding remedial actions, and other data regarding activity on a network.

The processor 108 may be any hardware device capable of executing instructions on memory 110 to detect a malicious actor. The processor 108 may be a microprocessor, a field programmable gate array (FPGA), an application-specific integrated circuit (ASIC), or other similar device.

In some embodiments, such as those relying on one or more ASICs, the functionality described as being provided in part via software may instead be configured into the design of the ASICs and, as such, the associated software may be omitted. The processor 108 may be configured as part of the user device 102 on which the user interface 104 executes, such as a laptop, or may be located at some remote location.

The memory 110 may be L1, L2, L3 cache or RAM memory configurations. The memory 110 may include non-volatile memory such as flash memory, EPROM, EEPROM, ROM, and PROM, or volatile memory such as static or dynamic RAM, as discussed above. The exact configuration/type of memory 110 may of course vary as long as instructions for detecting a malicious actor can be executed by the processor 108 to accomplish the features of various embodiments described herein.

The system 100 may also include one or more databases 112 for storing data regarding identified malicious actors and generated pseudo hostnames. Additionally, the one or more databases 112 may store data regarding known, authentic hosts on one or more networks 114. Accordingly, the processor 108 can avoid generating pseudo hostnames that are associated with authentic devices or systems.

The user device 102 and processor 108 may be located on or otherwise in communication with one or more networks 114 and one or more hosts 116 on the network(s) 114. The network(s) 114 may link the various devices with various types of network connections. The network(s) 114 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network or networks 114 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The processor 108 may receive data regarding activity on the network(s) 114 such as the names of hosts 116 and network traffic involving one or more hosts 116. Although not shown in FIG. 1, the system 100 may further include any additional required components such as, but not limited to, hubs, switches, routers, or the like.

Figure 2A:
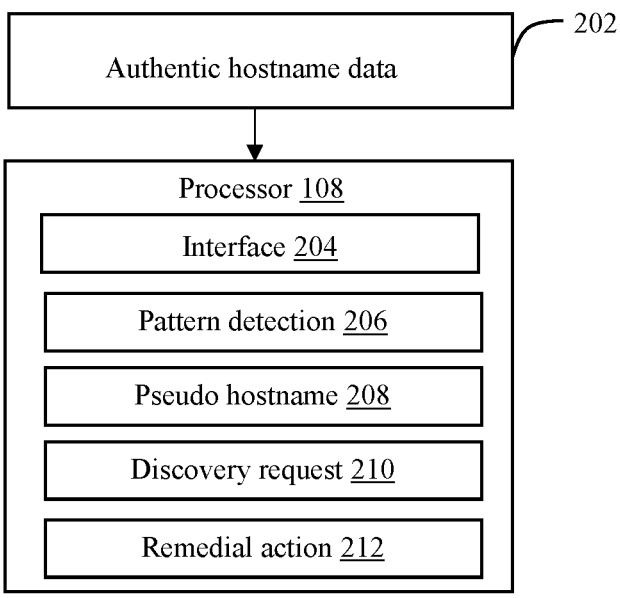
FIGS. 2A-C illustrate a workflow for detecting a malicious actor on a network using the processor of FIG. 1 in accordance with one embodiment.
Figure 2B:
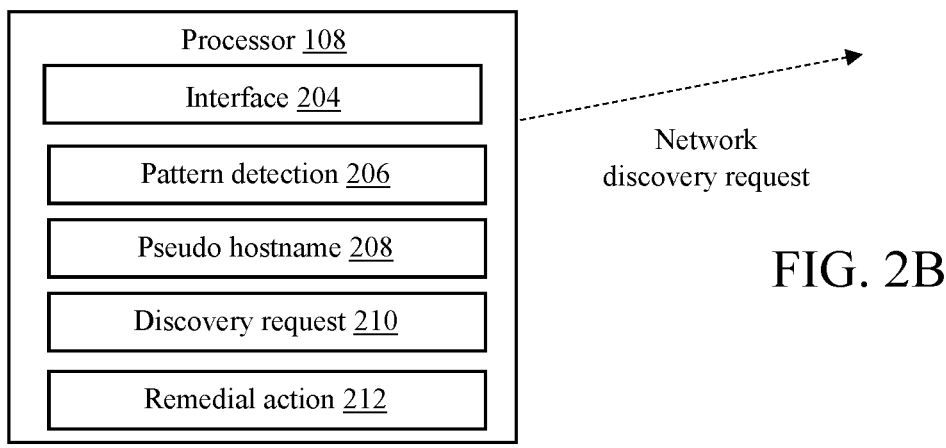
Figure 2C:
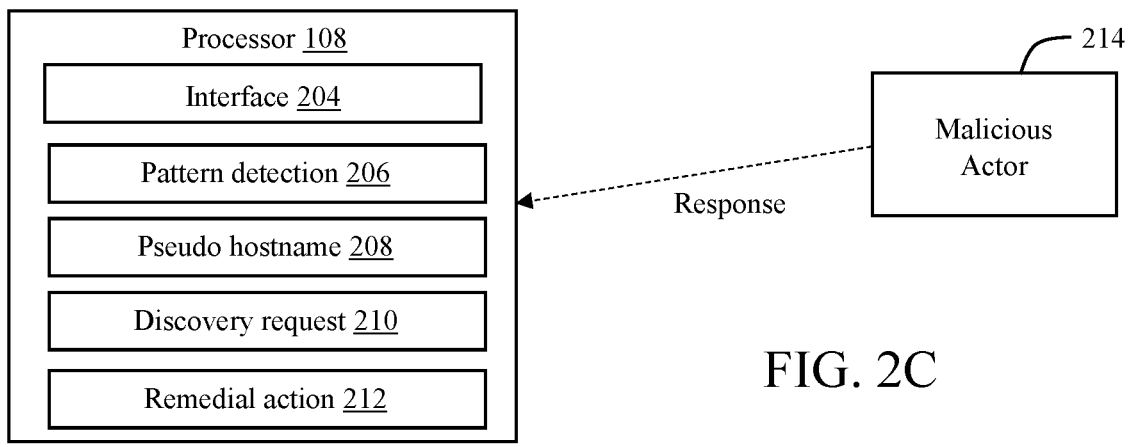

FIGS. 2A-C illustrate a workflow for detecting a malicious actor on a network using the processor 108 of FIG. 1 in accordance with one embodiment. As discussed above, the processor 108 may generate one or more pseudo hostnames based on authentic hostname data 202.

As seen in FIGS. 2A-C, the processor 108 may include an interface 204 for receiving the authentic hostname data 202, a pattern detection module 206, a pseudo hostname generator 208, a discovery request module 210, and a remedial action module 212. The processor interface 204 may receive the authentic hostname data 202 on a network such as the network 114 of FIG. 1. This data 202 may include names of the hosts on the network as well as data regarding traffic on the network.

The pattern detection module 206 may analyze the received data 202 regarding authentic hostnames. Based on this analysis, the pattern detection module 206 may learn about hostnames and any associated patterns.

For example, on a given network there may be a policy to have hostnames follow a pattern such as Location-Device-Type-Number (e.g., LA-VMWARE-123). Given enough examples of authentic hostnames, the pattern detection module 206 may learn that authentic hostnames may always have, for example, a certain amount of letters followed by a dash, followed by more letters, followed by another dash, followed by numbers, etc.

The pseudo hostname generator 208 may then generate one or more pseudo hostnames that resemble authentic systems. In particular, the pseudo hostname generator 208 may analyze the network traffic from authentic systems and base the generated pseudo hostnames on authentic hosts associated with the network traffic. For example, as mentioned above, the pattern detection module 206 may detect that most of the systems on the network have hostnames of a pattern X-Y-Z, and the pseudo hostname generator 208 may generate the pseudo hostnames in accord with the detected pattern.

For instance, Applicant has gathered data regarding NetBIOS activity on a network for a period of time. Applicant collected authentic hostnames from its local network and split the hostnames into logical pieces (e.g., by adding spaces around dashes (-), periods (.), and numbers. For example, hostname "GRP1-WIN-123" would be transformed into "GRP1-WIN-123."

The pseudo name generator 208 may receive these transformed hostnames and execute any suitable machine learning techniques to generate the pseudo hostnames. For example, the pseudo hostname generator 208 may feed the transformed hostnames into the python library 'markovify,' which takes space delimited data and generates a markov chain. Below is an exemplary portion of code that may be used to generate the pseudo hostnames based on this technique.

```
import markovify
with open("/home/username/Documents/hostnames", "r") as f:
    names=f.read( )
text_model=markovify.NewlineText(names)
print(text_model.make_sentence( ).replace(" ", " "))
```

Based on the received hostname GRP1-WIN-123.local, this technique may generate pseudo hostnames such as:
GRP2-WIN-98244322.local
GRP1-WIN-4268
GRP2-WIN-98245.local
GRP2-WIN-146.local
GRP1-WIN-12334.local
GRP2-WIN-673535.local Accordingly, these generated pseudo hostnames are similar to the input. The pseudo hostname generator 208 may also be configured to avoid collisions by not generating hostnames that are identical to the training data (i.e., authentic hostnames) or previously-generated pseudo hostnames. For example, the pseudo hostname generator 208 may consult the database 112 of existing hostnames (authentic or pseudo) to avoid collisions.

Using the 'markovify' library is only one exemplary technique for generating pseudo hostnames based on pattern detection. For example, in other embodiments, the pseudo name generator 208 may implement a neural network to automate the pattern identification.

In other embodiments, the pseudo hostname generator 208 may generate the pseudo hostnames based on the local system's hostname (e.g., by mutating at least one portion of the local system's hostname). For example, given a local hostname of "GRP1-WIN-12334.local" the pseudo hostname generator 208 may identify number(s) in the hostname, parse the number(s), and multiply them by some value (e.g., by 2). Based on the given local hostname above, this technique would generate the pseudo hostname "GRP1-WIN-24688.local."

Similarly, the pseudo hostname generator 208 may further obfuscate a pseudo host name by changing random letters thereof. For example, the pseudo hostname generator 208 may replace GRP1 with GRR1. These types of changes do not change the overall structure of the hostname, but nonetheless generate a pseudo hostname that may still appear authentic to a malicious actor.

The pseudo hostname generator 208 may use a string distance measuring algorithm to control the degree of similarity/dissimilarity of a pseudo hostname with respect to an authentic hostname. This ensures the generated pseudo hostname stays within at least some distance from the authentic hostname (to avoid collisions) but not too far away to be too different to arouse suspicion.

In yet other embodiments, the pseudo hostname generator 208 may provide (or may allow an end user to provide) a regular expression or template to be used to generate the pseudo hostnames. For example, a customer or and end user may provide a regex to describe common hostnames.

Using the provided regex or template, the pseudo hostname generator 208 may describe common hostnames as '(GRP1|GRP2)-(WIN|LNX)-\{4}.' The pseudo hostname generator 208 may then generate a hostname such as "GRP2-WIN-0123" by using, for example, the python library 'exrex' with the code 'exrex.getone('(GRP1|GRP2)-WIN|LNX)-\d{4}').

In FIG. 2B, the discovery request module 210 may then issue one or more network discovery requests for the generated pseudo hostname. The discovery request module 210 may issue any type of suitable discovery request. For example, the network discovery request may be a NetBIOS request, an ARP discovery request, a DNS discovery request, a DHCP discovery request, a Bonjour discovery request, and a UPnP discovery request. This list is merely exemplary, and any other suitable type of request may be used as long as the features of the various embodiments described herein may be accomplished.

As these network discovery requests are for pseudo hostnames (i.e., hostnames not associated with any authentic or otherwise legitimate system or device), it follows that there should be no response. However, and as mentioned previously, malicious actors may be tempted to respond to such a network discovery request, claiming to be the sought-after system or device. This is particularly true if the network discovery request is for a hostname that appears authentic.

In FIG. 2C, the processor 108 may receive a response to the network discovery request. As the hostname associated with the network discovery request is not associated with any authentic system or device, it can be inferred that the device, and by association the user, associated with the response is a malicious actor 214.

The remedial action module 212 may then execute one or more remedial actions in response to received response (and the detection of the malicious actor 214). For example, an alert may be issued to a user via a user interface such as the interface 104 of FIG. 1. The alert may be a visual alert, an audio alert, a haptic-based alert, or some combination thereof. A user may then investigate what caused the alert, the identified malicious actor, etc. In other embodiments, the malicious actor may be blacklisted, elevated for further examination, or the like.

Figure 3:
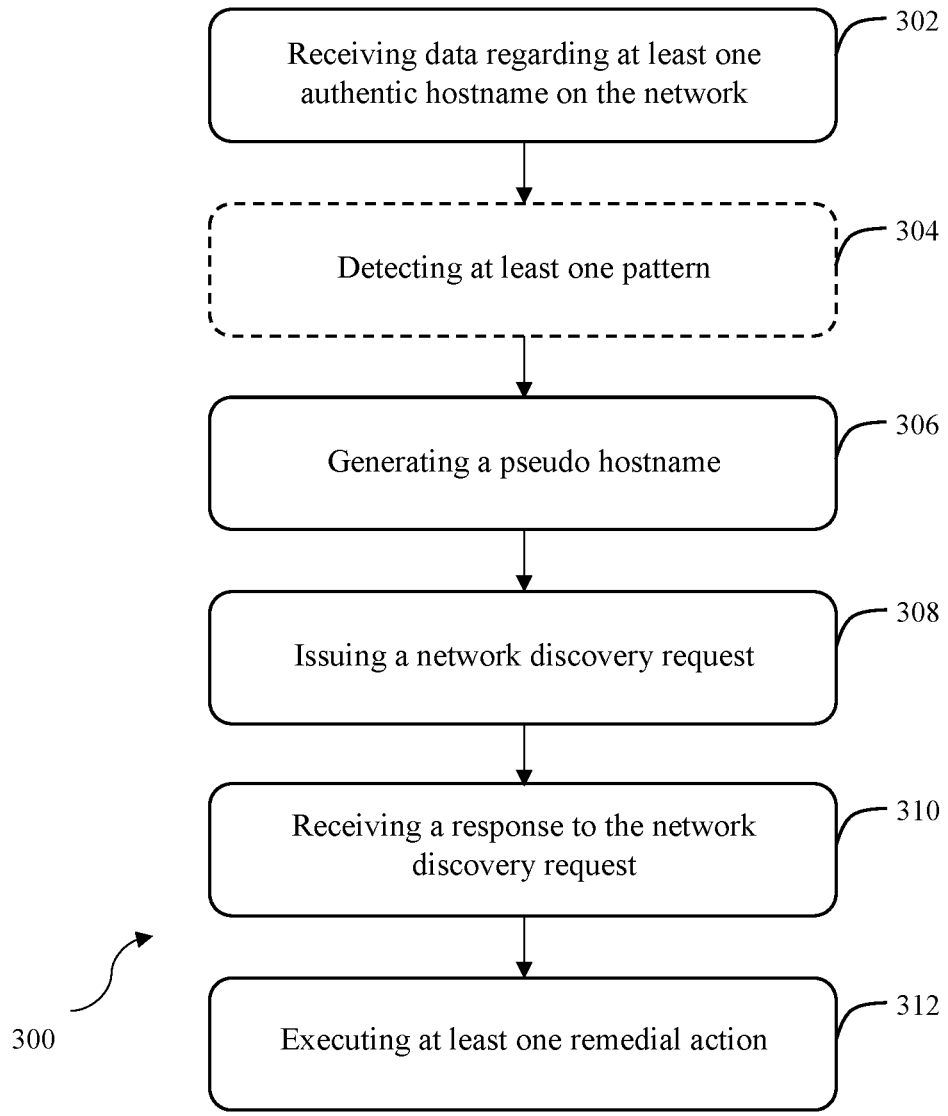
FIG. 3 depicts a flowchart of a method for detecting a malicious actor on a network in accordance with one embodiment.

FIG. 3 depicts a flowchart of a method 300 for detecting malicious actors in accordance with one embodiment. Step 302 involves receiving data regarding at least one authentic hostname on the network. This data may include data regarding network traffic, local hostnames, or the names of other hosts on the network.

Step 304 is optional and involves detecting at least one pattern associated with the at least one authentic hostname on the network. The detected pattern may relate to the format the hostname, and may include at least one of a Unicode character, a word, an alphanumeric token, and an alphanumeric sequence, as well as the number and position thereof.

Step 306 involves generating a pseudo hostname based on the data regarding the at least one authentic hostname. Step 306 may be performed by a pseudo hostname generator such as the pseudo hostname generator 208 of FIG. 2, for example.

The pseudo hostname may be generated in accord with the at least one pattern detected in step 304, if applicable. For example, if it is detected that the authentic hostnames generally include specific numbers or letters and in a certain format, the pseudo hostname may be generated to include the detected numbers/letters in the detected format. Additionally or alternatively, the generated pseudo hostname may be based on a local hostname or based on a regular expression (e.g., provided by a customer or end user), as discussed above.

Step 308 involves issuing a network discovery request for the generated pseudo hostname. The network discovery request may be any one of a NetBIOS request, an ARP discovery request, a DNS discovery request, a DHCP discovery request, a Bonjour discovery request, and a UPnP discovery request, for example.

A processor such as the processor 108 of FIGS. 1 and 2A-C may issue one or more network discovery requests at predetermined time intervals. For example, the processor may generate a new pseudo hostname and issue a network discovery request for the new pseudo hostname once every five minutes.

The processor may also increase the amount of issued network discovery requests based on the amount of activity in a network. For example, the amount of generated pseudo hostnames and issued requests may be scaled up or down upon the detection of increased or decreased malicious activity on a network, respectively.

Step 310 involves receiving a response to the network discovery request. As the network discovery request is for a device or system that does not exist, it can be inferred that any response is due to the action of a malicious actor trying to impersonate a device or system. Accordingly, it can be inferred that a received response is associated with a malicious or otherwise non-legitimate actor.

Step 312 involves executing at least one remedial action based on the received response. For example, an alert may be issued to a user via a user interface, the malicious actor may be blacklisted, the malicious actor may be elevated for further examination, or the like.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for detecting a malicious actor on a network, the method comprising:
   receiving data regarding at least one authentic hostname on the network;
   generating a pseudo hostname based on the data regarding the at least one authentic hostname, wherein the generated pseudo hostname does not exist on the network as there are no devices on the network with the generated pseudo hostname;
   issuing a first plurality of network discovery requests for the pseudo hostname to encourage a malicious actor to respond;
   receiving at least one response to the network discovery request, wherein each received response is determined to be from a malicious actor as the issued network discovery request is for the pseudo hostname that does not exist on the network; and
   scaling an amount of issued network discovery requests up or down based on a number of received responses to the network discovery requests.

2. The method of claim 1 wherein the data regarding the at least one authentic hostname on the network includes network traffic involving at least one legitimate system on the network.

3. The method of claim 1 further comprising detecting at least one pattern associated with the at least one authentic hostname on the network.

4. The method of claim 3 wherein generating the pseudo hostname includes generating the pseudo hostname in accord with the at least one detected pattern.

5. The method of claim 3 wherein the at least one detected pattern includes at least one of a Unicode character, a word, an alphanumeric token, and an alphanumeric sequence.

6. The method of claim 1 wherein scaling the amount of issued network discovery requests includes increasing the amount of issued network discovery requests based on a detection of increased malicious activity on the network as indicated by a number of received responses.

7. The method of claim 1 wherein generating the pseudo hostname includes executing a distance measuring algorithm on the pseudo hostname with respect to the at least one authentic hostname on the network to ensure the generated pseudo hostname is within a predetermined distance from the at least one authentic hostname.

8. The method of claim 1 wherein scaling the amount of issued network discovery requests includes decreasing the amount of issued network discovery requests based on a detection of decreased malicious activity on the network as indicated by a number of received responses.

9. The method of claim 1 wherein generating the pseudo hostname includes:
   receiving at least one authentic hostname, and
   mutating at least one portion of the at least one authentic hostname.

10. The method of claim 1 wherein the generated pseudo hostname is based on a template.

11. A system for detecting a malicious actor on a network, the system comprising:
   an interface for receiving data regarding at least one authentic hostname on the network;
   a memory; and
   a processor executing instructions stored on the memory to:
      generate a pseudo hostname based on the data regarding the at least one authentic hostname, wherein the generated pseudo hostname does not exist on the network as there are no devices on the network with the generated pseudo hostname,
      issue a first plurality of network discovery requests for the pseudo hostname to encourage a malicious actor to respond,
      receive at least one response to the network discovery request, wherein each received response is determined to be from a malicious actor as the issued network discovery request is for the pseudo hostname that does not exist on the network, and
      scale an amount of issued network discovery requests up or down based on a number of received responses to the network discovery requests.

12. The system of claim 11 wherein the data regarding the at least one authentic hostname on the network includes network traffic involving at least one legitimate system on the network.

13. The system of claim 11 wherein the processor is further configured to detect at least one pattern associated with the at least one authentic hostname on the network.

14. The system of claim 13 wherein the processor generates the pseudo hostname in accord with the at least one detected pattern.

15. The system of claim 13 wherein the at least one detected pattern includes at least one of a Unicode character, a word, an alphanumeric token, and an alphanumeric sequence.

16. The system of claim 11 wherein the processor scales the amount of issued network discovery requests by increasing the amount of issued network discovery requests based on a detection of increased malicious activity on the network as indicated by a number of received responses.

17. The system of claim 11 wherein the processor generates the pseudo hostname by executing a distance measuring algorithm on the pseudo hostname with respect to the at least one authentic hostname to ensure the generated pseudo hostname is within a predetermined distance from the at least one authentic hostname.

18. The system of claim 11 wherein the processor scales the amount of issued network discovery requests by decreasing the amount of issued network discovery requests based on a detection of decreased malicious activity on the network as indicated by a number of received responses.

19. The system of claim 11 wherein the processor is configured to generate the pseudo hostname by:
   receiving at least one authentic hostname, and
   mutating at least one portion of the at least one authentic hostname.

20. The system of claim 11 wherein the generated pseudo hostname is based on a template.

* * * * *